United States Patent
Ariaux et al.

(10) Patent No.: US 11,685,231 B2
(45) Date of Patent: Jun. 27, 2023

(54) HVAC-MODULE

(71) Applicant: Mahle International GmbH, Stuttgart (DE)

(72) Inventors: Cecile Ariaux, Logelbach (FR); Emmanuel Fleith, Holtzwihr (FR); Cyril Humbert, Strasbourg (FR); Arnaud Schneider, Soultz Haut Rhin (FR)

(73) Assignee: MAHLE INTERNATIONAL GMBH

( * ) Notice: Subject to any disclaimer, the term of this patent is extended or adjusted under 35 U.S.C. 154(b) by 272 days.

(21) Appl. No.: 16/914,265

(22) Filed: Jun. 26, 2020

(65) Prior Publication Data
US 2020/0406710 A1    Dec. 31, 2020

(30) Foreign Application Priority Data

Jun. 28, 2019   (EP) ..................... 19183282

(51) Int. Cl.
*B60H 1/00*   (2006.01)

(52) U.S. Cl.
CPC ..... *B60H 1/00871* (2013.01); *B60H 1/00021* (2013.01); *B60H 1/00328* (2013.01);
(Continued)

(58) Field of Classification Search
CPC ...... B60H 2001/00128; B60H 1/00871; B60H 1/00021; B60H 1/0005; B60H 1/00328;
(Continued)

(56) References Cited

U.S. PATENT DOCUMENTS 5,884,689 A * 3/1999 Takechi ............ B60H 1/00021
                                                62/244
6,009,934 A * 1/2000 Sunaga ............. B60H 1/00064
                                                62/244
(Continued)

FOREIGN PATENT DOCUMENTS

CN   111619303 A  *  9/2020  ......... B60H 1/00021
DE   10320750 A1  * 12/2004  .......... B60H 1/0005
(Continued)

OTHER PUBLICATIONS

WO-2019044302-A1 English machine translation (Year: 2019).*
English abstract for EP-1616733.
Engish abstract for FR-2853722.

*Primary Examiner* — Jenna M Hopkins
(74) *Attorney, Agent, or Firm* — Fishman Stewart PLLC

(57) ABSTRACT

An HVAC module may include an air path through which air is flowable, an evaporator, and a heater. The evaporator and the heater may subdivide the air path into a main path and a side path. The main path may pass through the evaporator and the heater. The side path may branch off from the main path upstream of the evaporator and may open into the main path downstream of the heater. The side path may be fluidically connected to the main path between the evaporator and the heater. A first valve flap may be arranged in the air path and may be adjustable to a closed position and to an open position. A second valve flap may be arranged in the air path and may be adjustable to a first position, to a second position, and to a third position.

18 Claims, 6 Drawing Sheets

(52) U.S. Cl.
CPC ..... *B60H 1/00485* (2013.01); *B60H 1/00542* (2013.01); *B60H 1/00878* (2013.01); *B60H 2001/00092* (2013.01); *B60H 2001/00128* (2013.01); *B60H 2001/00164* (2013.01)

(58) Field of Classification Search
CPC ............ B60H 1/00485; B60H 1/00542; B60H 1/2215; B60H 1/2218; B60H 1/2225; B60H 2001/00092; B60H 2001/00164; B60H 2001/2265
See application file for complete search history.

(56) References Cited

U.S. PATENT DOCUMENTS

| | | | | |
|---|---|---|---|---|
| 6,092,592 | A * | 7/2000 | Toyoshima | B60H 1/0005 454/126 |
| 9,884,534 | B2 * | 2/2018 | Wawzyniak | B60H 1/0005 |
| 2003/0116303 | A1 * | 6/2003 | Kang | B60H 1/00064 62/244 |
| 2005/0115704 | A1 | 6/2005 | Ito et al. | |
| 2006/0108094 | A1 * | 5/2006 | Abouchaar | B60H 1/00685 165/42 |
| 2013/0098595 | A1 * | 4/2013 | Schall | A45F 3/06 236/12.15 |
| 2014/0194048 | A1 * | 7/2014 | Wittmann | B60H 1/00028 454/141 |
| 2015/0059378 | A1 * | 3/2015 | Burd | B64D 13/06 62/239 |
| 2015/0174985 | A1 * | 6/2015 | Wawzyniak | B60H 1/0005 165/63 |
| 2016/0039266 | A1 * | 2/2016 | De Souza | F24H 9/2071 219/202 |
| 2016/0159193 | A1 * | 6/2016 | Laux | B60H 1/0005 454/126 |
| 2017/0232813 | A1 * | 8/2017 | Kullen | B60H 1/0005 62/285 |
| 2018/0105018 | A1 * | 4/2018 | Johnston | B60H 1/00064 |
| 2019/0359026 | A1 * | 11/2019 | Salazar | B60H 1/2225 |
| 2020/0016956 | A1 * | 1/2020 | Kwon | H05B 3/50 |
| 2020/0108692 | A1 * | 4/2020 | Lee | B60H 3/024 |
| 2020/0406710 | A1 * | 12/2020 | Ariaux | B60H 1/00328 |

FOREIGN PATENT DOCUMENTS

| | | | | |
|---|---|---|---|---|
| DE | 102010029495 | A1 * | 12/2011 | ......... B60H 1/0005 |
| DE | 102010035740 | A1 * | 3/2012 | ......... B60H 1/0005 |
| DE | 102010042051 | A1 * | 4/2012 | ......... B60H 1/0005 |
| DE | 102014203850 | A1 * | 9/2014 | ......... B60H 1/00678 |
| DE | 102013227046 | A1 * | 6/2015 | ......... B60H 1/00007 |
| DE | 102014224817 | A1 * | 6/2016 | ......... B60H 1/00035 |
| DE | 102016202444 | A1 * | 8/2017 | ......... B60H 1/00035 |
| DE | 102016202445 | A1 * | 8/2017 | ......... B60H 1/0005 |
| DE | 102016203926 | A1 * | 9/2017 | |
| EP | 1510375 | A1 * | 3/2005 | ......... B60H 1/00064 |
| EP | 1616733 | A1 | 1/2006 | |
| EP | 2774790 | A1 * | 9/2014 | ......... B60H 1/00678 |
| EP | 3756913 | B1 * | 3/2022 | ......... B60H 1/00021 |
| FR | 2853722 | B1 | 11/2009 | |
| FR | 3022853 | A1 * | 1/2016 | ......... B60H 1/0005 |
| JP | 62071717 | A * | 10/1988 | |
| KR | 100853174 | B1 * | 4/2002 | |
| KR | 20170037850 | A * | 4/2017 | |
| WO | WO-0232705 | A1 * | 4/2002 | ......... B60H 1/0005 |
| WO | WO-2019044302 | A1 * | 3/2019 | ......... B60H 1/00057 |

* cited by examiner

HVAC-MODULE

CROSS-REFERENCE TO RELATED APPLICATIONS

This application claims priority to European Patent Application No. EP19183282.3, filed on Jun. 28, 2019, the contents of which is hereby incorporated by reference in its entirety.

TECHNICAL FIELD

The present invention concerns a HVAC module, in particular for an automotive vehicle. The invention also concerns a motor vehicle equipped with such a HVAC module.

BACKGROUND

So-called HVAC modules ("Heating-Ventilation-Air Conditioning Module") are often used to create pleasant air conditions for passengers in the passenger compartment of a motor vehicle. Such HVAC modules usually have an evaporator for dehumidifying and cooling the air, a heating device for heating the air and several air outlets which are fluidically connected to several ventilation openings limiting the vehicle interior. The ventilation openings shall be adjacent to different compartments of the vehicle interior, such as a foot compartment, a compartment in the area of a window pane, or an area along a central axis of the vehicle interior.

It is important to supply air outlets of the HVAC module with air that is adapted to the needs of the vehicle occupants in terms of temperature, humidity and air volume.

SUMMARY

It is therefore a task of the present invention to create an improved or at least alternative HVAC module, which allows the simultaneous generation of air with spatially varying air temperature and humidity, which can be individually supplied to different areas of a vehicle interior.

This task is solved by the subject matter of independent claim(s). Advantageous embodiments are the subject matter of the dependent claim(s).

The basic idea of the invention is therefore to divide an air path of a HVAC module with an evaporator and a heating device into a main path leading through the evaporator and the heating device and into a side path leading past the evaporator and the heating device and, in addition, to control, by means of a first and a second valve flap, the sectional flow of the air through the main and side path in such a way that different air outlets of the HVAC module can be supplied with a different throughput of air and/or with air of different temperature and/or humidity.

In this way, when the HVAC module is installed, different areas of the vehicle interior of a motor vehicle can be supplied with individually adjustable quantities of air—adapted to the individual needs and wishes of the occupants—while at the same time both temperature and humidity of the air can also be individually adjusted. This means that individually adapted ventilation conditions can be achieved for different parts of the vehicle interior, which are pleasant for the individual occupants.

A HVAC module in accordance with the invention, in particular for a motor vehicle, comprises an air path for the passage of air, in which an evaporator for cooling and dehumidifying the air and a heating device for heating the air are arranged. The evaporator and the heating device divide the air path into a main path, which passes through the evaporator and the heating device, and a side path, which runs fluidically parallel to the main path and passes the evaporator and the heating device. The side path branches off from the main path upstream of the evaporator, flows back into the main path downstream of the heating device and is also fluidically connected to the main path between the evaporator and the heating device. The HVAC module also includes a first side path portion of the side path passing the evaporator and a second side path portion of the side path passing the heater. In addition, the HVAC module has a first valve flap arranged in the air path and adjustable between a closed position and an open position such that in the closed position no air upstream of the evaporator can flow from the main path directly into the first side path portion and in the open position air upstream of the evaporator can flow from the main path directly into the first side path portion. The HVAC module also has a second valve flap arranged in the air path and adjustable between a first, second and third position such that in the first position air can flow from the first side path portion directly into a main path intermediate portion formed between the evaporator and the heater, but no air can flow from the first side path portion and from the main path intermediate portion directly into the second side path portion. In the second position, air can flow from the main path intermediate portion directly into the second side path portion, but no air can flow from the first side path portion directly into the main path intermediate portion and directly into the second side path portion. In the third position, air can flow from both the first side path portion and the main intermediate path portion directly into the second side path portion. In this way, by means of only two valve flaps, a large number of flow paths can be set for the flow paths through the main and side path, so that in portions of the side path and the main path a different amount of air and also air of different temperature or humidity can flow in each case.

According to a preferred embodiment, the second valve flap is arranged in the air path and adjustable between the second and third positions such that in the second position the flow cross-section for air that can be led from the intermediate main path portion directly into the second side path portion is larger than in the third position. With this embodiment, the amount of air flowing from the first side path portion and from the main path intermediate portion to the second side path portion can be variably adjusted.

The HVAC module advantageously comprises control means arranged to adjust the first valve flap between the closed position and the open position and to adjust the second valve flap between the first, second and third positions and, in use, to control the first valve flap and the second valve flap. This allows the control of both valve flaps for easy setting of different operating states of the HVAC module.

According to another preferred embodiment, the HVAC module has a first operating condition in which the first valve flap is in the closed position and the second valve flap is in the first position so that air can flow upstream of the evaporator from the main path through the evaporator but not directly into the first side path portion, and air can flow from the main path intermediate portion through the heater, but not directly into the second side path portion. This embodiment enables particularly strong dehumidification and heating of the air supplied to the HVAC module and is particularly advantageous for humid and cold air supplied to the HVAC module.

According to another preferred embodiment, the HVAC module has a second operating condition in which the first valve flap is in the open position and the second valve flap is in the first position so that air can flow upstream of the evaporator from the main path through the evaporator and directly into the first side path portion, and air can flow from the main path intermediate portion through the heater, but not directly into the second side path portion. This type of embodiment enables particularly strong heating of the air supplied to the HVAC module and is particularly advantageous for dry and very cold air supplied to the HVAC module. At the same time the evaporator can be operated with reduced capacity or switched off so that the energy consumption of the HVAC module is reduced.

According to another preferred embodiment, the HVAC module has a third operating state in which the first valve flap is in the closed position and the second valve flap is in the second position so that air can flow upstream from the evaporator from the main path through the evaporator, but not directly into the first side path portion, and air can flow from the main path intermediate portion through the heater and directly into the second side path portion. This embodiment enables particularly strong dehumidification and cooling of the air supplied to the HVAC module and is particularly advantageous when the air supplied to the HVAC module is particularly warm and/or humid. In addition, this version allows the heater to be operated at reduced power or to be switched off so that the energy consumption of the HVAC module can be reduced.

According to another preferred embodiment, the HVAC module has a fourth operating condition in which the first valve flap is in the open position and the second valve flap is in the third position so that air can flow upstream of the evaporator from the main path through the evaporator and directly into the first side path portion, and air can flow from the main path intermediate portion through the heater and directly into the second side path portion. This embodiment allows a strong heating of the air supplied to the HVAC module and is particularly advantageous when the air supplied to the HVAC module is particularly dry and cold. In addition, with this embodiment the evaporator can be operated with reduced output or switched off. The same applies, alternatively or additionally, to a blower for feeding air into the HVAC module. In other words, the HVAC-module can be operated at maximum throughput of air and lowest electrical consumption.

According to another preferred embodiment, the HVAC module has a fifth operating state in which the first valve flap is in the closed position and the second valve flap is in the third position so that air can flow upstream from the evaporator from the main path through the evaporator but not directly into the first side path portion, and air can flow from the main path intermediate portion through the heater and directly into the second side path portion. This embodiment enables particularly strong dehumidification and heating of the air supplied to the HVAC module and is particularly advantageous for humid and cold air supplied to the HVAC module. In addition, with this version, the heater can be operated at reduced power or switched off so that the energy consumption of the HVAC module can be reduced.

The air path is preferably formed exclusively by the main path and the side path. This embodiment enables a particularly compact geometry of the HVAC module and, in addition, a particularly efficient flow through the air path.

Preferably, the air path is divided into the main path and the side path without dividing walls. This embodiment also enables a particularly efficient air flow through the air path and additionally reduces the manufacturing costs of the HVAC module.

In accordance with another advantageous embodiment, the main path and the side path are bounded by a common housing. This embodiment also enables a particularly compact geometry of the HVAC module and, in addition, a particularly efficient flow through the air path.

According to another advantageous embodiment, the main path and the side path do not cross. This embodiment also enables a particularly compact geometry of the HVAC module and, in addition, a particularly efficient air flow through the air path.

According to another advantageous embodiment, the first side path portion and the second side path portion pass the evaporator and the heating device respectively on the same side of the main path. This embodiment also enables a particularly compact geometry of the HVAC module and, in addition, a particularly efficient flow through the air path. In addition, air outlets arranged in an extension of the side path can be flowed through in this way with a larger quantity of air than air outlets arranged in an extension of the main path.

The heating device preferably comprises a plurality of heating portions, the heating device being configured in such a way that the individual heating portions can be heated individually. In this way, air outlets downstream of the heating portions of the heating device can be supplied with air of different heated air intensity and thus with air of different air temperature—and supplied via these different zones of the vehicle interior.

In another preferred embodiment, the HVAC module includes an air outlet assembly arranged in the air path with a plurality of air outlets for removing air from the HVAC module, the air outlets being adjacent to each other. This embodiment enables a particularly compact geometry of the HVAC module. In addition, a particularly simple and cost-effective production of the HVAC module is achieved in this way.

According to another preferred embodiment, the majority of air outlets are arranged in a grid pattern in at least two grid rows and in at least two grid columns. This embodiment requires very little construction space. It is also possible to supply the individual air outlets with air at different temperature/humidity and/or with different air flow rates.

According to another preferred embodiment, the air outlets of each grid line have a common adjustable air flap for closing the outlet openings of the air outlets of the grid line in question. The respective air damper can be adjusted between a closed state, in which no air can flow through the respective outlet openings, and an open state with maximum opening. It goes without saying that a large number of intermediate positions between the closed position and the open position can also be set in the air damper. In this way, the air mass flow, which exits the module via the air outlets assigned to the respective air flap and is fed to a vehicle interior fluidly connected downstream of the module, can be flexibly adjusted and thus also varied.

In accordance with a particularly advantageous embodiment, the air flaps of a respective grid line extend along a direction, preferably the vertical direction, orthogonal to a direction, preferably the transverse direction, along which the heating portions of the heating device are arranged side by side.

In this way, air can flow through air outlets fluidically connected downstream of the heating portions of the heating device, the quantity and temperature of which can be individually controlled or regulated for air outlets in different grid lines and different grid columns, in a particularly large number of combinations and also with particular precision.

In accordance with a preferred embodiment, the air outlets are arranged in at least one, preferably exactly one, grid line in an extension of the side path. This means that air outlets arranged in an extension of the side path can be flowed through with a particularly high quantity of air.

According to another preferred embodiment, the air outlets are arranged in at least one, preferably exactly two, grid lines in an extension of the main path. With this embodiment, air outlets arranged in the extension of the main path can thus be flowed through with an air of particularly high temperature.

According to another preferred embodiment, the air outlets are arranged in at least one, preferably exactly one, grid line, both in a lengthening of the side path and in an extension of the main path. In this way, air outlets arranged in an extension of the main path and the side path can be flowed through with air at particularly high temperatures and in particularly large quantities.

The invention also concerns an automotive motor vehicle with a vehicle interior and with at least one fresh air path which, in order to supply the vehicle interior with fresh air, fluidically connects the vehicle interior with an external environment of the motor vehicle. The motor vehicle also comprises a HVAC module, as invented, arranged in at least one fresh air path. Advantages of the HVAC module according to the invention are thus also transferred to the motor vehicle according to the invention.

When the HVAC module is installed in the vehicle, it is advantageous that the heating device is arranged in the air path in such a way that no air can flow past it in the direction of gravity below the heating device.

A particular advantage of the HVAC module when installed in a motor vehicle is that the evaporator is arranged in the air path in such a way that no air can flow past the evaporator in the direction of gravity below it.

In this way, a particularly robust and efficient design of the HVAC module can be achieved, especially for collecting and discharging condensate condensed in the area of the evaporator.

Further important features and advantages of the invention result from the claims, the drawings and the accompanying figure description on the basis of the drawings.

It goes without saying that the features mentioned above and the features to be explained below may not only be used in the combination indicated, but also in other combinations or in a unique position, without leaving the scope of this invention.

Preferred examples of the execution of the invention are shown in the drawings and are explained in more detail in the following description, whereby identical reference signs refer to identical or similar or functionally identical components.

BRIEF DESCRIPTION OF THE DRAWINGS

They show, each schematically.

DETAILED DESCRIPTION

Figure 1:
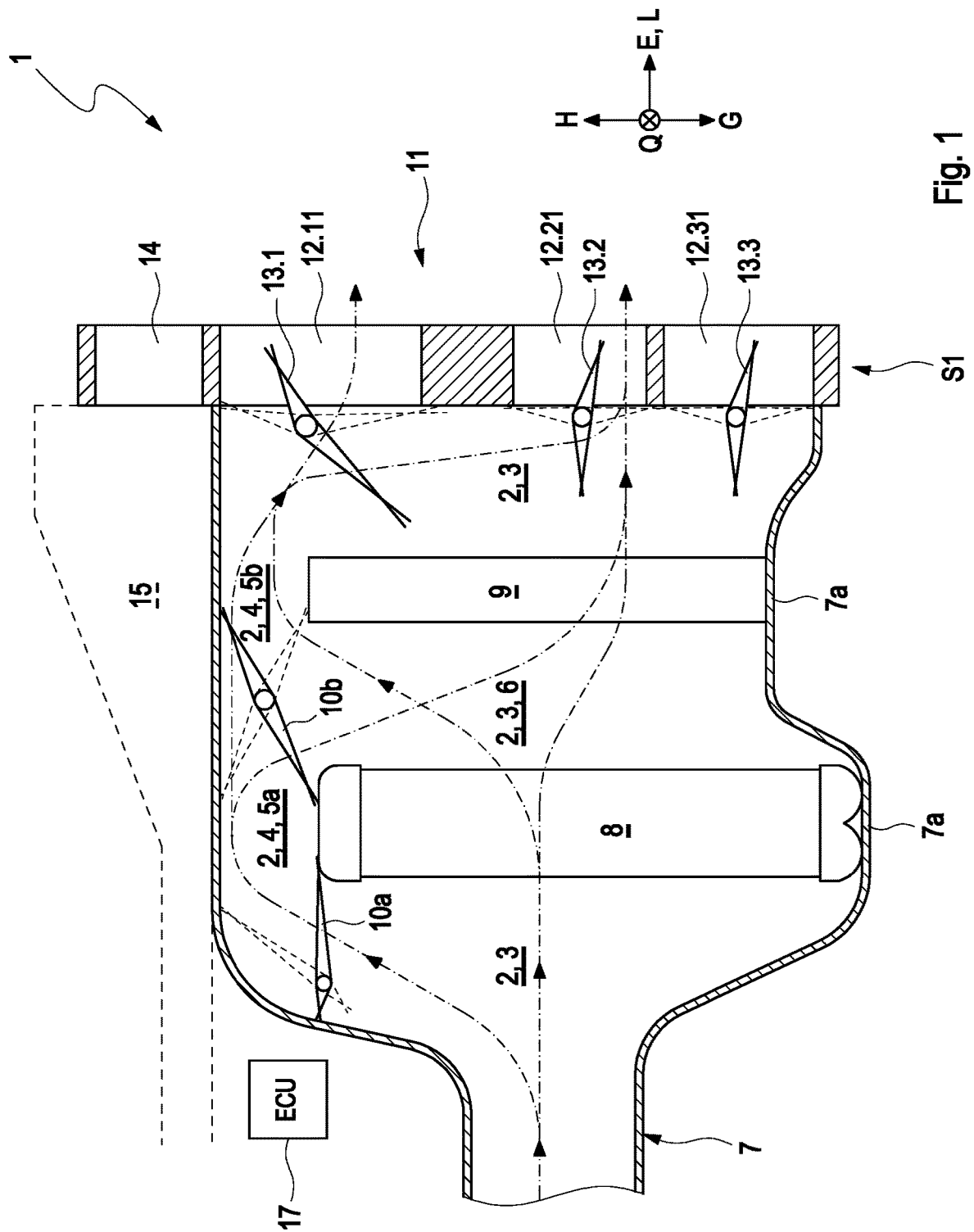
FIG. 1 shows a simplified representation of a HVAC module in a sectional view.

FIG. 1 shows an example of a HVAC module 1 without a connected blower room 24 in a sectional view along a principal extension direction E—hereinafter also referred to as longitudinal direction L—of an air path 2 and along a vertical direction H which extends perpendicularly to the longitudinal direction L or principal extension direction E of air path 2. A transverse direction Q extends perpendicularly to both the vertical direction H and the longitudinal direction L.

The HVAC module 1 comprises an air path housing 7 which limits an air path 2 for the passage of air supplied to the HVAC module 1. Air path 2 contains an evaporator 8 for cooling and dehumidifying the air and a heating device 9 downstream of the evaporator 8 for heating the air. The evaporator 8 and the heating device 9 divide the air path 2 into a main path 3, which leads through the evaporator 8 and the heating device 9, and a side path 4, which runs fluidically parallel to the main path 3 and leads past the evaporator 8 and the heating device 9. In the context of this invention, fluidic parallel fluid paths are not geometrically parallel fluid paths, but fluid paths which are connected to each other at a branch point and at an orifice point, whereby the fluid paths can also be connected to each other between the branch point and the orifice point. Fluidically parallel fluid paths, however, can also be geometrically parallel to each other or not geometrically parallel to each other.

The side path 4 branches off from the main path 3 upstream of the evaporator 8 and flows back into the main path 3 downstream of the heating device 9. Between the evaporator 8 and the heating device 9, the side path 4 is fluidically connected to an intermediate main path portion 6 of the main path 3 arranged between the evaporator 8 and the heating device 9. A first side path portion 5a of side path 4 passes the evaporator 8. A second side path portion 5b of the side path 4 leads past the heating device 9.

Figure 2:
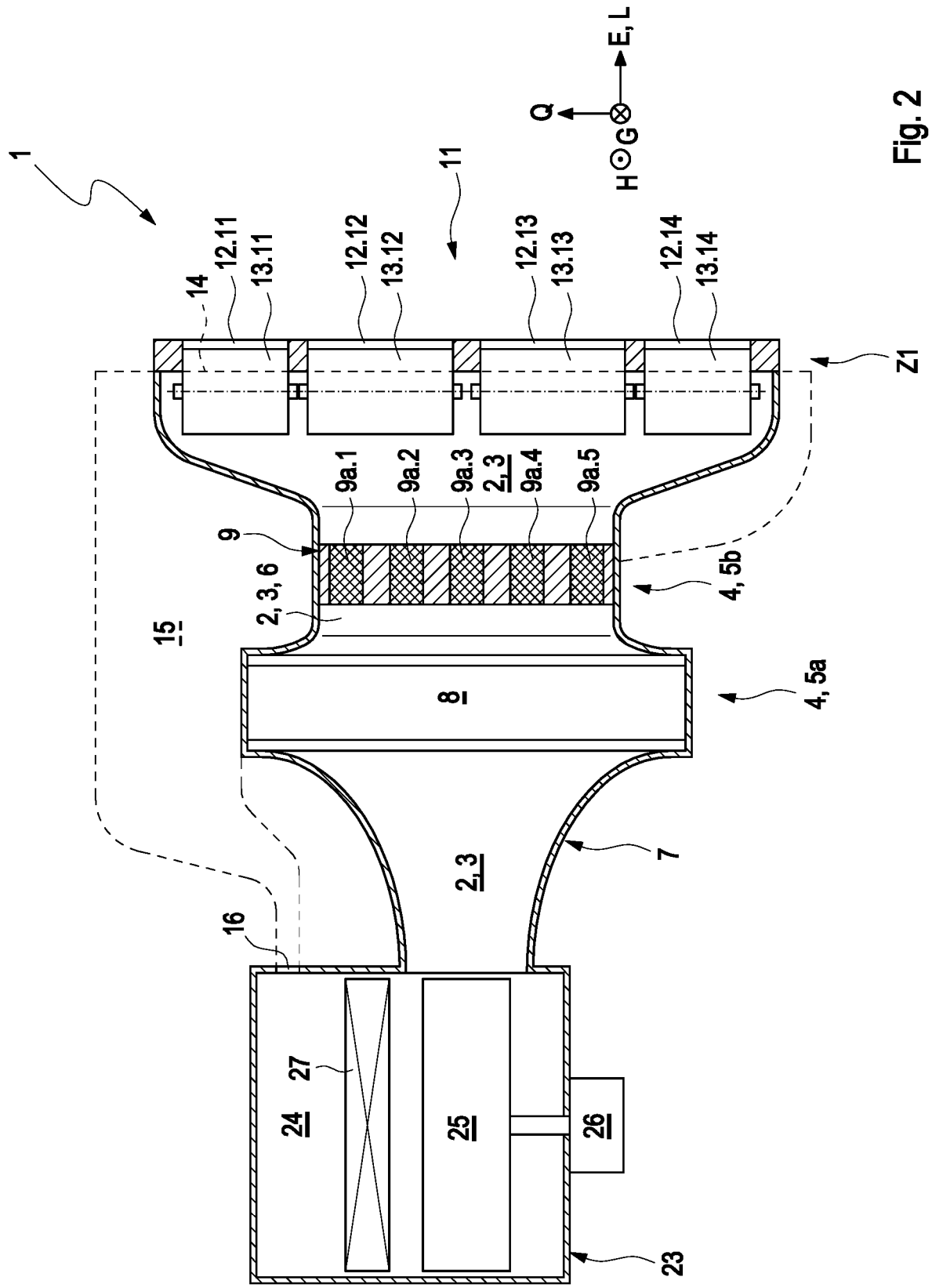
FIG. 2 shows a simplified representation of a HVAC module with connected fan compartment in a sectional view perpendicular to the view of FIG. 1.

In the examples of FIGS. 1 and 2, air path 2 is exclusively formed by the main path 3 and the side path 4. As shown, air path 2 can be divided into main path 3 and side path 4 without a partition wall. In FIGS. 4 to 8, separation of the air path 2 into the main path 3 and the side path 4 is indicated by a virtual dividing line T. The air path 2 is divided into the main path 3 and the side path 4 by a virtual dividing line T. The air path 2 is divided into the main path 3 and the side path 4 by a virtual dividing line T.

In FIGS. 1 and 2 it can also be seen that the main path 3 and the side path 4 are bounded by a common housing 7. The main path 3 and the side path 4 are designed in such a way that they do not cross each other. The first side path portion 5a and the second side path portion 5b lead past the evaporator 8 and the heating device 9 respectively on the same side of the main path 3 in FIG. 1.

As shown in FIG. 1, module 1 comprises a first valve flap 10a and a second valve flap 10b. The first valve flap 10a is located in the air path 2 and is adjustable between a closed position and an open position, such that in the closed position no air can flow upstream of the evaporator 8 from the main path 3 directly into the first side path portion 5a. In the open position, on the other hand, air can flow upstream of evaporator 8 from main path 3 directly into the first side path portion 5a.

In the context of this invention, a direct flow is understood to mean a flow in which the air does not flow through the evaporator 8 or through the heating device 9. The second valve flap 10b is arranged in the air path 2 and adjustable between a first, second and third position, so that in the first position air can flow from the first side path portion 5a directly into the main path intermediate portion 6. However, in the first position of the second valve flap 10b no air can flow from the first side path portion 5a and from the main path portion 6 directly into the second side path portion 5b. In the second position of the second valve flap 10b, air from the main path intermediate portion 6 can flow directly into the second side path portion 5b, but no air from the first side path portion 5a can flow directly into the main path intermediate portion 6 and directly into the second side path portion 5b. In the third position of the second valve flap 10b, air can flow directly from both the first side path portion 5a and the main-path intermediate portion 6 to the second side path portion 5b.

As an example, FIG. 1 shows the first valve flap 10a in the closing position and the second valve flap 10b in the first position. FIG. 1 shows a first valve flap 10a in the furnace position with dotted lines and a second valve flap 10b in the second position. The second valve flap 10b in the example in FIG. 1 is arranged in air path 2 and is adjustable between the second and the third position in such a way that in the second position a flow cross-section for air that can be guided directly from the intermediate main path portion 6 to the second side path portion 5b is larger than in the third position. In other words, in the second position of the second valve flap 10b more air can flow from the main path intermediate portion 6 directly into the second side path portion 5b than in the third position.

In FIG. 1 it can be seen that the module 1 comprises a control device 17 which is set up for adjusting the first valve flap 10a between the closed position and the open position and for adjusting the second valve flap 10b between the first, second and third position (the communication of the control device 17 with the first and second valve flaps 10a and 10b is not shown in FIG. 1 for reasons of clarity). When HVAC module 1 is in operation, the control unit 17 controls the first and second valve flaps 10a, 10b to adjust the first and second valve flaps 10a, 10b, respectively. In the example scenario of the figures, the first and second valve flaps 10a, 10b can be controlled independently of each other by the control system 17 and can therefore be adjusted independently of each other.

By adjusting the two valve flaps 10a, 10b to the mentioned positions, different operating states can be set in the HVAC module 1. FIGS. 4 to 8 each illustrate a first to fifth operating state of module 1.

Figure 4:
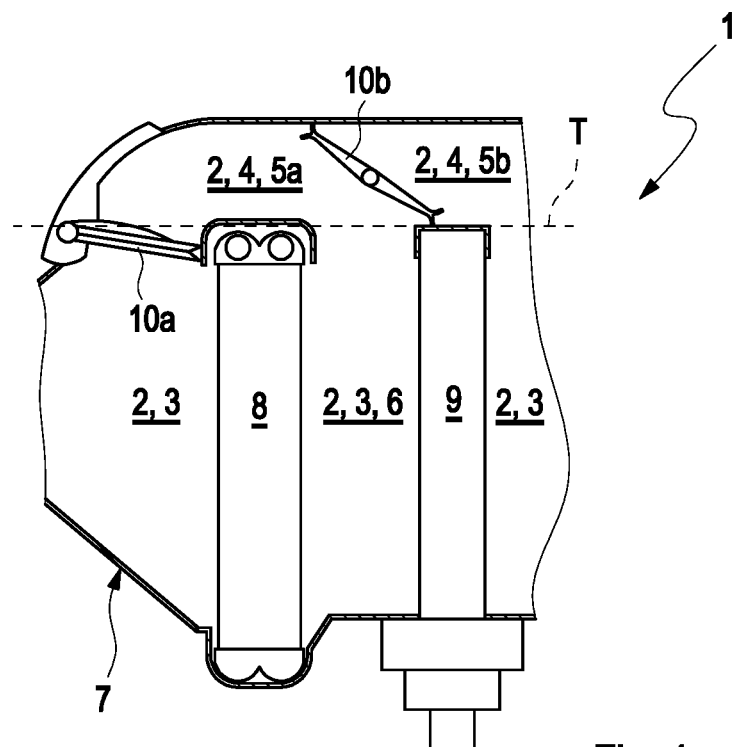
FIG. 4 shows a detailed view of the HVAC module in a first operating state.

FIG. 4 shows a first operating state of HVAC module 1 in which the first valve flap 10a is in the closed position and the second valve flap 10b is in the first position. In this operating condition, air can flow upstream from the evaporator 8 from the main path 3 through the evaporator 8, but not directly into the first side path portion 5a, and air can flow from the main path portion 6 through the heater 9, but not directly into the second side path portion 5b.

Figure 5:
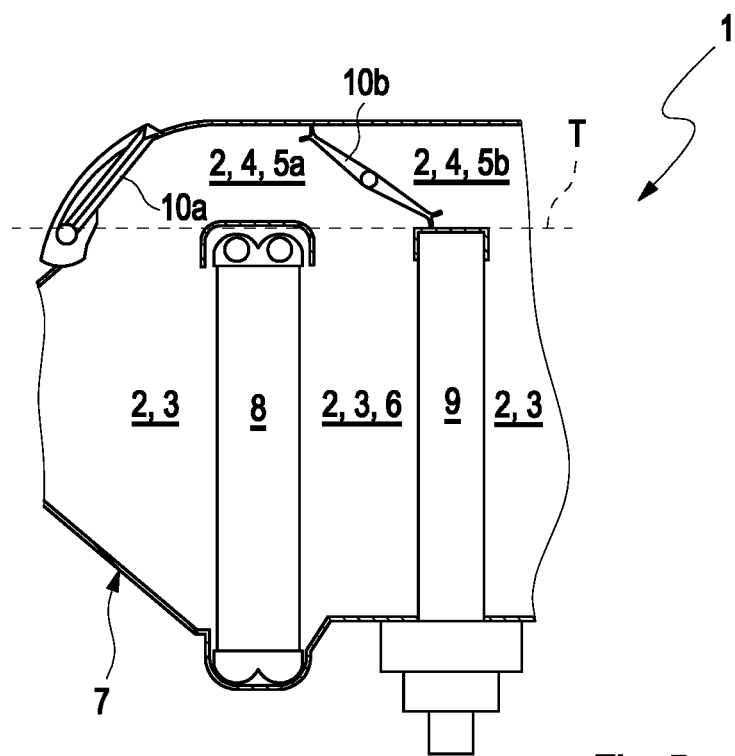
FIG. 5 shows a detailed view of the HVAC module in a second operating state.

FIG. 5 shows a second operating state of HVAC module 1 in which the first valve flap 10a is in the open position and the second valve flap 10b is in the first position. In this second operating condition, air can flow upstream from the evaporator 8 from the main path 3 through the evaporator 8 and directly into the first side path portion 5a, and air can flow from the main path portion 6 through the heater 9, but not directly into the second side path portion 5b.

Figure 6:
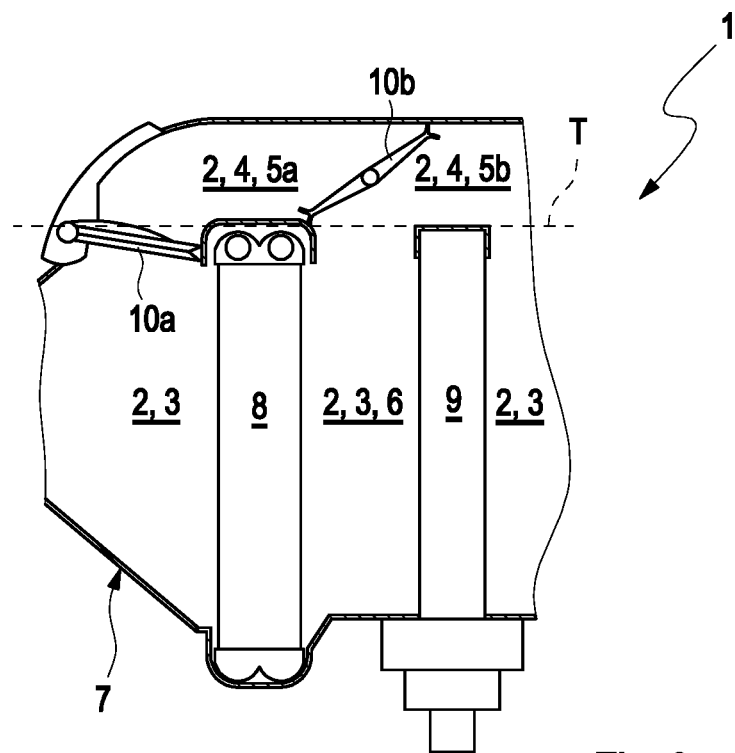
FIG. 6 shows a detailed view of the HVAC module in a third operating state.

FIG. 6 shows a third operating state of HVAC module 1 in which the first valve flap 10a is in the closed position and the second valve flap 10b is in the second position. In this third operating condition, air can flow upstream from the evaporator 8 from the main path 3 through the evaporator 8, but not directly into the first side path portion 5a, and air can flow from the main path portion 6 through the heater 9, and directly into the second side path portion 5b.

Figure 7:
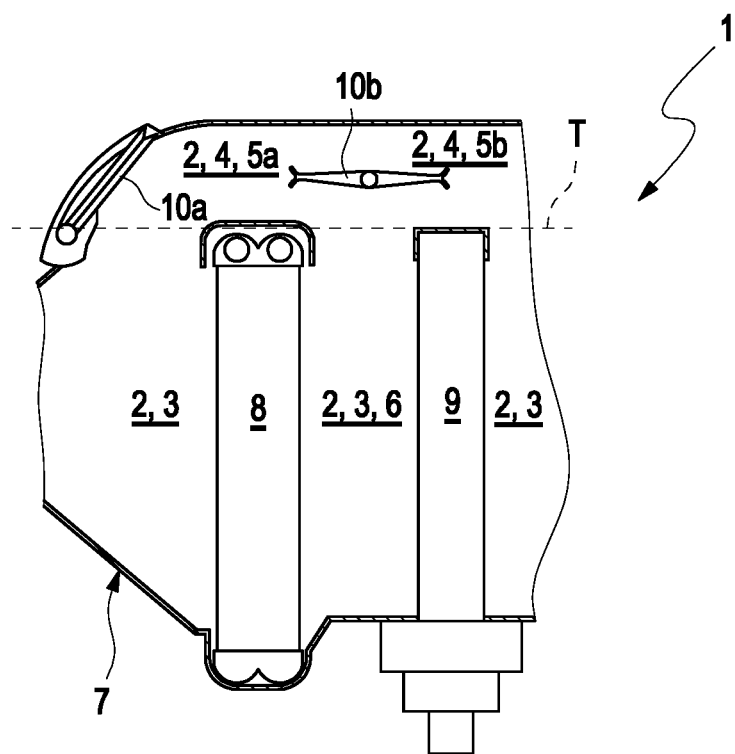
FIG. 7 shows a detailed view of the HVAC module in a fourth operating state.

FIG. 7 shows a fourth operating state of HVAC module 1 in which the first valve flap 10a is in the open position and the second valve flap 10b is in the third position. In this fourth operating condition, air can flow upstream from the evaporator 8 from the main path 3 through the evaporator 8 and directly into the first side path portion 5a, and air can flow from the main path portion 6 through the heater 9 and directly into the second side path portion 5b.

Figure 8:
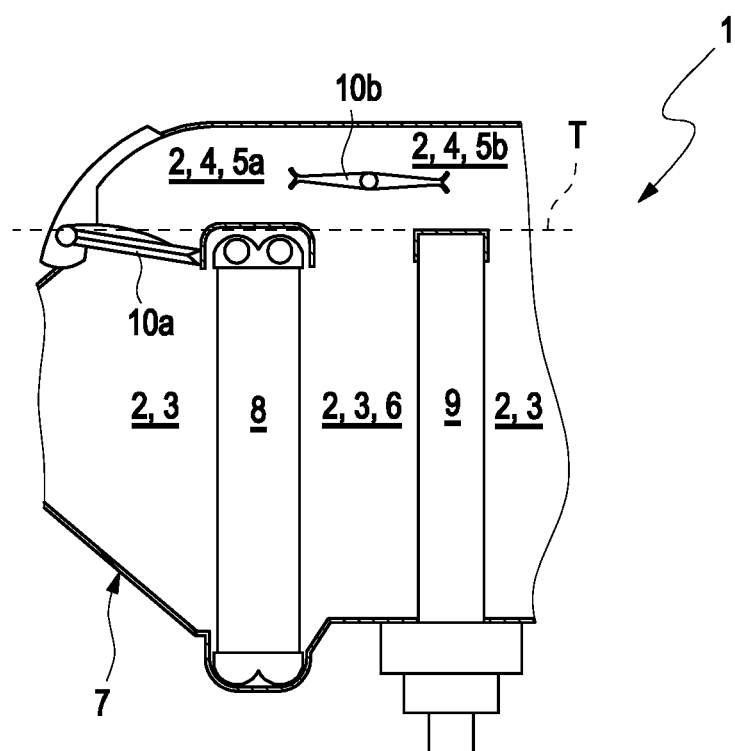
FIG. 8 shows a detailed view of the HVAC module in a fifth operating state.

FIG. 8 shows a fifth operating state of the HVAC module in which the first valve flap 10a is in the closed position and the second valve flap 10b is in the third position. In this fifth operating condition, air can flow upstream from the evaporator 8 from the main path 3 through the evaporator 8, but not directly into the first side path portion 5a, and air can flow from the main path portion 6 through the heater 9 and directly into the second side path portion 5b.

In the third operating condition, the flow cross-section for air that can be led from the intermediate main path portion 6 directly into the second side path portion 5b and via the first side path portion 5a is greater than in the fourth and fifth operating condition.

Figure 3:
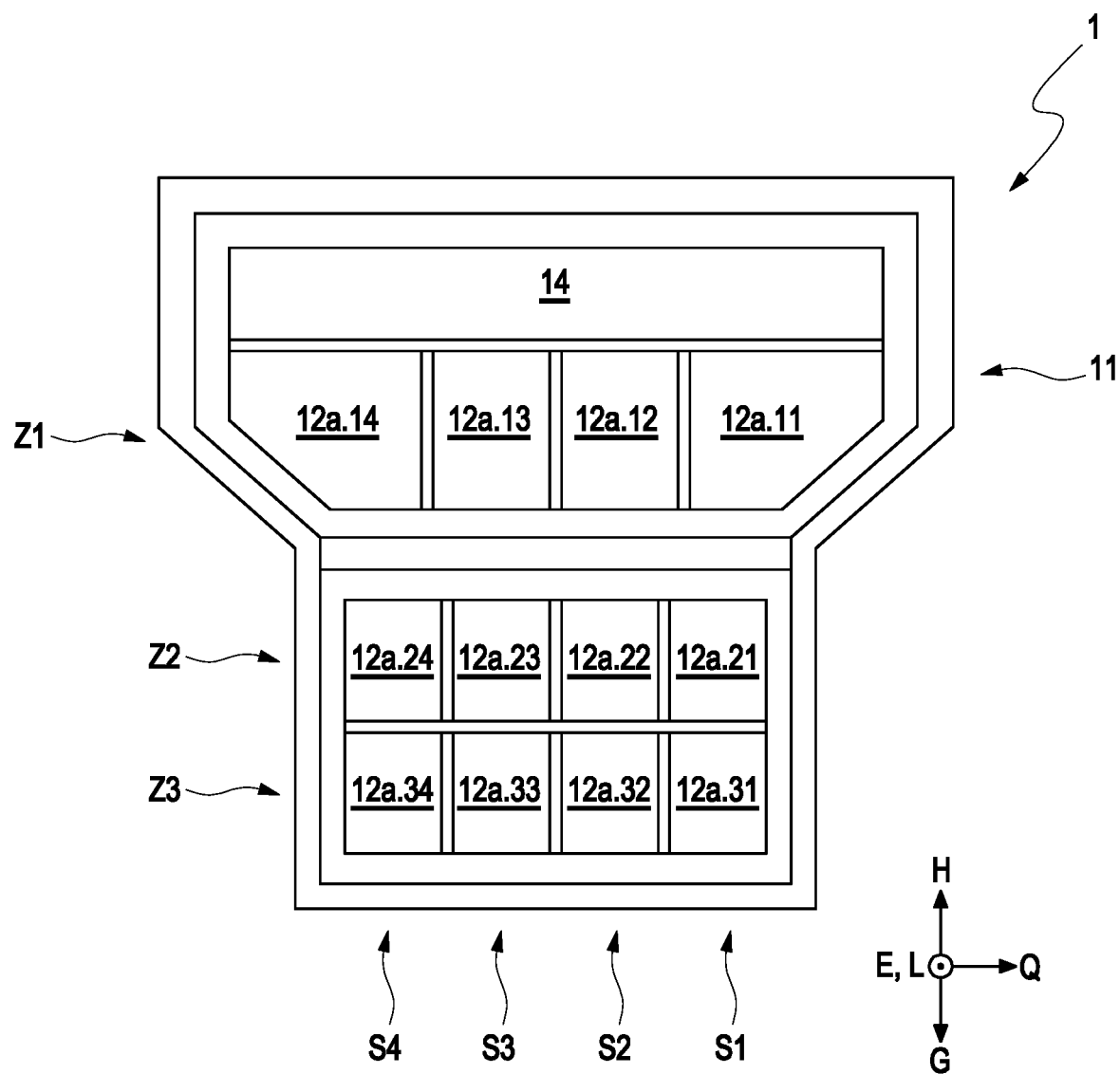
FIG. 3 shows a detailed view of an outlet arrangement of the HVAC module.

In the following, reference is made to FIG. 3, which shows an air outlet arrangement 11 of the HVAC module 1 in a plan view along the main extension direction E and along the longitudinal direction L, respectively. Module 1 therefore comprises an air outlet assembly 11 arranged in air path 2 with a plurality of air outlets 12 for discharging air from module 1, the air outlets 12 being arranged adjacent to each other. The air outlets 12 are arranged in a grid pattern in several grid rows Z and grid columns S. The example in FIG. 3 shows three grid lines Z1, Z2, Z3 and four grid columns S1, S2, S3, S4. This means that a total of twelve air outlets 12 are provided in the example. Each individual air outlet 12 is thus assigned both to a specific grid line Z1, Z2, Z3 and to a specific grid column S1, S2, S3, S4. In the following, the nomenclature 12.ZS is used to designate which grid line Z and which grid column S a respective air outlet 12 is assigned to. The air diffuser 12.34 is thus assigned to the third grid line Z3 and the fourth grid column S4.

FIG. 3 also shows that each air outlet 12 includes an outlet opening 12a. The same nomenclature is used for outlet openings 12a as for air outlets 12, i.e. the outlet opening 12a.34 is assigned to the third grid line Z3 and the fourth grid column S4. The air outlet assembly 11 may include an outlet plate in which the outlet openings 12a are arranged.

Air from the HVAC module 1 can be directed into different areas of the vehicle interior of a motor vehicle via the different outlet openings 12a. For this purpose, the respective outlet openings 12a can be fluidically connected to different zones of the vehicle interior via suitable air ducts (not shown). It is conceivable, for example, that the outlet opening 12a.11 is fluidically connected via a suitable air duct to the area of a windscreen of the motor vehicle. It is also conceivable, for example, that the outlet opening 12a.31 is fluidically connected to the area of a rear footwell of the vehicle interior via a suitable air duct.

In the example of FIG. 1, the air outlets 12 of each of the three grid lines Z1 to Z3 can be closed with a common air flap 13.1, 13.2, 13.3. In other words, each of the grid lines Z1 to Z3 is assigned an air flap 13.1, 13.2, 13.3. In this way, the air outlets 12 of the air outlet arrangement can be flowed through with a variable and different amount of air.

FIG. 2 shows an alternative scenario in which each air outlet is assigned an individual air flap to close the respective air outlet openings. In the example of FIG. 2 the four shown air outlets 12.11, 12.12, 12.13, 12.14 of the grid line Z1 shown can be closed with their own air flaps 13.11, 13.12, 13.13 or 13.14. This allows a more individual control of the individual air outlets compared to the example in FIG. 1. On the other hand, the variant of FIG. 1 is technically simpler and therefore cheaper than the variant of FIG. 2.

In the example of FIG. 1, the air outlet arrangement 11 has exactly one grid line Z1 whose air outlets 12 are arranged in an extension of the side path 4. The air outlets 12 of grid line Z1 are additionally arranged in an extension of main path 3. In the example of FIG. 1, the air outlet arrangement 11 also has two grid lines Z2, Z3, whose air outlets 12 are arranged in an extension of the main path 3. The extensions of the side path 4 and of the main path 3 extend in the case of the figures along the main extension direction E or the longitudinal direction L. It is also conceivable, however, that an extension of the side path 4 or of the main path 3 is designed as a fluidically downstream extension which is not geometrically linear and follows the side path 4 or the main path 3. Arrows and dashed lines are used to illustrate possible air flow paths.

In an installed condition of the HVAC module 1 in a motor vehicle, the heating device 9 is appropriately arranged in the air path 2, as indicated, such that no air can flow past the heating device 9 in the direction of gravity G below it. Such a scenario, in which the vertical direction H is opposite to gravity direction G, is shown in FIG. 1. When the module 1 is installed in the motor vehicle, the heating device 9 can touch a lower housing wall 7a of the housing 7 with respect to the direction of gravity G as shown in FIG. 1. When the module 1 is installed in the motor vehicle, the heating device 9 is conveniently located below the bypass path 4 with respect to the direction of gravity G. The module 1 can also be installed in the motor vehicle with the heating device 9 in the direction of gravity G below the side path 4. In the installed state, the evaporator 8 can also be arranged in air path 2 in such a way that no air in gravity direction G can flow past the evaporator 8 below it, which is also illustrated directly in FIG. 1. When the HVAC module 1 is installed in vehicle, the evaporator 8 can touch a lower housing wall 7a of the housing 7 with respect to the direction of gravity G as shown in FIG. 1. At the lower end of the evaporator 8, in relation to gravity direction G, a condensate path can again be formed for the discharge of liquid condensed in the air path or on the evaporator 8 from HVAC module 1 (the condensate path is not shown in the figures for the sake of clarity).

FIG. 2 shows a HVAC module 1 with a connected blower room 24 in a sectional view along the main extension direction E and perpendicular to the vertical direction H or perpendicular to the transverse direction Q. The blower room 24 is limited by a blower housing 23 and is fluidically connected to air path 2 and via an air inlet 16 to a return path 15. In the blower room 24 there is a filter 27 for filtering air and a blower 25 for conveying air from the blower room 24 into the air path 2 and for sucking air through the air intake 16. An electrical motor 26 is connected to the blower 25 to operate the blower 25. The feedback path inlet 14 is fluidically connected to the dashed feedback path 15.

As can also be seen from FIG. 2, the heater 9 comprises a plurality of heating portions 9a in which air flowing through the heater 9 can be heated. For this purpose, electrical heating elements (not shown) may be arranged in the respective heating portion 9a, which heat the air flowing through the respective heating portion 9a. In the example in FIG. 2, five heating portions 9a are arranged next to each other along the transverse direction Q and at a distance from each other. The five heating portions 9a are additionally marked in FIG. 2 with the reference sign 9a.1 to 9a.5 for better differentiation. The five heating portions 9a allow the air guided through the various heating portions 9a to be heated to different degrees, i.e. individually, by setting the electrical heating elements individually for each heating portion 9a. This in turn allows air to be supplied at different temperatures to the various air outlets 12 of the air outlet arrangement 11, which are connected fluidically downstream of the heating device 9.

As FIG. 2 shows, the air outlet 12.11 is presumably primarily traversed by air from heating portion 9a.1. On the other hand, the air diffuser 12.14 is primarily supplied with air from heating portion 9a.5, etc. The configuration of the heating device 9 with the heating portions 9a and the air outlet arrangement 11 with the air outlets 12 presented here thus makes it possible to introduce heated air of varying intensity via the air outlets 12 into different areas of a vehicle interior fluidically following the air outlet arrangement 12 of the module 1.

The invention claimed is:

1. An HVAC module, comprising:
an air path through which air is flowable;
an evaporator arranged in the air path for cooling and dehumidifying the air;
a heater arranged in the air path for heating the air;
the evaporator and the heater subdividing the air path into a main path, which passes through the evaporator and the heater, and into a side path which extends fluidically parallel to the main path and passes the evaporator and the heater;
the side path branching off from the main path upstream of the evaporator and opening into the main path downstream of the heater;
the side path fluidically connected to the main path between the evaporator and the heater;
the side path including a first side path portion passing the evaporator and a second side path portion passing the heater;
a first valve flap arranged in the air path, the first valve flap adjustable to a closed position and to an open position such that:
when in the closed position, the air upstream of the evaporator is not flowable from the main path directly into the first side path portion; and
when in the open position, the air upstream of the evaporator is flowable from the main path directly into the first side path portion;
a second valve flap arranged in the air path;
wherein the second valve flap is adjustable to a first position, to a second position, and to a third position such that:
when in the first position, the air is flowable directly from the first side path portion into a main path intermediate portion of the main path disposed between the evaporator and the heater, the air is not flowable directly from the first side path portion into the second side path portion, and the air is not flowable directly from the main path intermediate portion into the second side path portion;

when in the second position, the air is flowable from the main path intermediate portion directly into the second side path portion, the air is not flowable from the first side path portion directly into the main path intermediate portion, and the air is not flowable from the first side path portion directly into the second side path portion; and when in the third position, the air is flowable directly from the first side path portion into the second side path portion and the air is flowable directly from the main path intermediate portion into the second side path portion;

wherein the first valve flap is arranged in the air path between the main path and the first side path portion;

wherein the second valve flap is arranged in the air path at a junction of the first side path portion, the second side path portion, and the main path intermediate portion;

wherein the first valve flap includes a first end and a second end;

wherein when the first valve flap is in the closed position, the first end of the first valve flap contacts a housing at least partially delimiting the air path and the second end of the first valve flap contacts the evaporator; and wherein when the first valve flap is in the open position, the first end of the first valve flap contacts the housing and the second end of the first valve flap does not contact the evaporator.

2. The HVAC module according to claim 1, wherein a flow cross-section via which the air is guidable directly from the main path intermediate portion into the second side path portion is greater when the second valve flap is in the second position than when the second valve flap is in the third position.

3. The HVAC module according to claim 1, further comprising a controller configured to adjust the first valve flap to the closed position and to the open position and to adjust the second valve flap to the first position, to the second position, and to the third position, and wherein during operation the controller controls the first valve flap and the second valve flap.

4. The HVAC module according to claim 1, wherein, at an operating condition, the first valve flap is in the closed position and the second valve flap is in the first position such that:
the air upstream of the evaporator is flowable from the main path through the evaporator and is not flowable directly from the main path into the first side path portion; and
the air is flowable from the main path intermediate portion through the heater and is not flowable directly from the main path intermediate portion into the second side path portion.

5. The HVAC module according to claim 1, wherein, at an operating condition, the first valve flap is in the open position and the second valve flap is in the first position such that:
the air upstream of the evaporator is flowable from the main path through the evaporator and directly into the first side path portion; and the air is flowable from the main path intermediate portion through the heater and is not flowable directly from the main path intermediate portion into the second side path portion.

6. The HVAC module according to claim 1, wherein, at an operating condition, the first valve flap is in the closed position and the second valve flap is in the second position such that:
the air upstream of the evaporator is flowable from the main path through the evaporator and is not flowable directly from the main path into the first side path portion; and
the air is flowable from the main path intermediate portion through the heater and directly into the second side path portion.

7. The HVAC module according to claim 1, wherein, at an operating condition, the first valve flap is in the open position and the second valve flap is in the third position such that:
the air upstream of the evaporator is flowable from the main path through the evaporator and directly into the first side path portion; and
the air is flowable from the main path intermediate portion through the heater and directly into the second side path portion.

8. The HVAC module according to claim 1, wherein, at an operating condition, the first valve flap is in the closed position and the second valve flap is in the third position such that:
the air upstream of the evaporator is flowable from the main path through the evaporator and is not flowable directly from the main path into the first side path portion; and
the air is flowable from the main path intermediate portion through the heater and directly into the second side path portion.

9. The HVAC module according to claim 1, wherein the air path is defined exclusively by the main path and the side path.

10. The HVAC module according to claim 1, wherein the air path is divided into the main path and the side path without a partition wall.

11. The HVAC module according to claim 1, wherein the main path and the side path are bounded by a common housing.

12. The HVAC module according to claim 1, wherein the first side path portion and the second side path portion pass the evaporator and the heater, respectively, on a same side of the main path.

13. The HVAC module according to claim 1, wherein:
at first operating condition, the first valve flap is in the closed position and the second valve flap is in the first position;
at a second operating condition, the first valve flap is in the open position and the second valve flap is in the first position;
at a third operating condition, the first valve flap is in the closed position and the second valve flap is in the second position;
at a fourth operating condition, the first valve flap is in the open position and the second valve flap is in the third position; and
at a fifth operating condition, the first valve flap is in the closed position and the second valve flap is in the third position.

14. The HVAC module according to claim 1, wherein:
the second valve flap includes a first end and a second end;
when the second valve flap is in the first position, the first end of the second valve flap contacts a housing at least partially delimiting the air path and the second end of the second valve flap contacts the heater;
when the second valve flap is in the second position, the first end of the second valve flap contacts the evaporator and the second end of the second valve flap contacts the housing; and
when the second valve flap is in the third position, the first end of the second valve flap does not contact the housing, the evaporator, nor the heater and the second end of the second valve flap does not contact the housing, the evaporator, nor the heater.

15. An HVAC module, comprising:
an air path through which air is flowable;
an evaporator arranged in the air path for cooling and dehumidifying the air;
a heater arranged in the air path for heating the air;
the air path including a main path and a side path, the main path passing through the evaporator and the heater, and the side path extending fluidically parallel to the main path and bypassing the evaporator and the heater;
the main path including a main path intermediate portion extending between the evaporator and the heater;
the side path including a first side path portion bypassing the evaporator and a second side path portion bypassing the heater, the first side path portion branching off from the main path upstream of the evaporator and opening into the main path intermediate portion and into the second side path portion, the second side path portion fluidically connected to the first side path portion and to the main path intermediate portion and opening into the main path downstream of the heater;
a first valve flap arranged in the air path between the main path and the first side path portion, the first valve flap adjustable to a closed position and to an open position;
a second valve flap arranged in the air path between the evaporator and the heater, the second valve flap adjustable to a first position, to a second position, and to a third position;
wherein, when the first valve flap is in the closed position, the air upstream of the evaporator is not flowable directly from the main path into the first side path portion;
wherein, when the first valve flap is in the open position, the air upstream of the evaporator is flowable directly from the main path into the first side path portion;
wherein, when the second valve flap is in the first position, the second valve flap closes the second side path portion such that the air is flowable directly from the first side path portion into the main path intermediate portion, the air is not flowable directly from the first side path portion into the second side path portion, and the air is not flowable directly from the main path intermediate portion into the second side path portion;
wherein, when the second valve flap is in the second position, the second valve flap closes the first side path portion such that the air is flowable directly from the main path intermediate portion into the second side path portion, the air is not flowable directly from the first side path portion into the main path intermediate portion, and the air is not flowable directly from the first side path portion into the second side path portion; and
wherein, when the second valve flap is in the third position, the second valve flap closes neither the first side path portion nor the second side path portion such that (i) the air is flowable directly from the first side path portion into the second side path portion and into the main path intermediate portion and (ii) the air is flowable directly from the main path intermediate portion into the second side path portion.

16. An HVAC module, comprising:
a housing at least partially delimiting an air path through which air is flowable;
an evaporator arranged in the air path for cooling and dehumidifying the air;
a heater arranged in the air path for heating the air;
the evaporator and the heater subdividing the air path into a main path, which passes through the evaporator and the heater, and into a side path which extends fluidically parallel to the main path and passes the evaporator and the heater;
the side path branching off from the main path upstream of the evaporator and opening into the main path downstream of the heater;
the side path fluidically connected to the main path between the evaporator and the heater;
the side path including a first side path portion passing the evaporator and a second side path portion passing the heater;
a first valve flap arranged in the air path, the first valve flap adjustable to a closed position and to an open position such that:
when in the closed position, the air upstream of the evaporator is not flowable from the main path directly into the first side path portion; and
when in the open position, the air upstream of the evaporator is flowable from the main path directly into the first side path portion;
a second valve flap arranged in the air path;
wherein the second valve flap is adjustable to a first position, to a second position, and to a third position;
wherein, when the second valve flap is in the first position, a first end of the second valve flap contacts the housing and a second end of the second valve flap contacts the heater such that:
the air is flowable directly from the first side path portion into a main path intermediate portion of the main path disposed between the evaporator and the heater;
the air is not flowable directly from the first side path portion into the second side path portion; and
the air is not flowable directly from the main path intermediate portion into the second side path portion;
wherein, when the second valve flap is in the second position, the first end of the second valve flap contacts the evaporator and the second end of the second valve flap contacts the housing such that:
the air is flowable from the main path intermediate portion directly into the second side path portion;
the air is not flowable from the first side path portion directly into the main path intermediate portion; and
the air is not flowable from the first side path portion directly into the second side path portion;
wherein, when the second valve flap is in the third position, the first end of the second valve flap does not contact the housing, the evaporator, nor the heater and the second end of the second valve flap does not contact the housing, the evaporator, nor the heater such that:
    the air is flowable directly from the first side path portion into the second side path portion; and
    the air is flowable directly from the main path intermediate portion into the second side path portion.

17. The HVAC module according to claim 1, further comprising an air outlet assembly disposed in the air path, wherein:
    the air outlet assembly includes a plurality of air outlets for discharging the air; and
    a first subset of air outlets of the plurality of air outlets are arranged in columns and rows to define an air outlet grid.

18. The HVAC module according to claim 17, wherein:
the air outlet assembly includes a feedback path inlet that is fluidically connected to a dashed feedback path;
a second subset of air outlets of the plurality of air outlets are arranged in a row to define an air outlet row;
the air outlet row and the air outlet grid are disposed spaced apart from one another; and
the feedback path inlet extends along the air outlet row adjacent to each of the second subset of air outlets.

* * * * *